(12) United States Patent
Jordan et al.

(10) Patent No.: US 11,177,637 B1
(45) Date of Patent: Nov. 16, 2021

(54) CORE-INCLUDING ITEM PROVIDED WITH STAGGERED ANCHORING LOCATIONS FOR HOLDING WINDABLE MATERIAL AND ASSOCIATED METHOD

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 15 days.

(21) Appl. No.: 16/501,230

(22) Filed: Mar. 8, 2019

(51) Int. Cl.
  *B65H 75/14* (2006.01)
  *B65H 75/28* (2006.01)
  *H02G 1/08* (2006.01)

(52) U.S. Cl.
  CPC ........... *H02G 1/081* (2013.01); *B65H 75/146* (2013.01); *B65H 75/28* (2013.01); *B65H 2701/36* (2013.01)

(58) Field of Classification Search
  CPC .. B65H 75/146; B65H 75/28; B65H 2701/34; B65H 2701/36
  USPC ........................................................ 242/582
  See application file for complete search history.

(56) References Cited

U.S. PATENT DOCUMENTS

| 3,815,837 | A | * | 6/1974 | Guthrie | .................. | B65H 75/28 |
| | | | | | | 242/550 |
| 2015/0034891 | A1 | * | 2/2015 | Carlson | .................. | H02G 1/081 |
| | | | | | | 254/134.3 R |

FOREIGN PATENT DOCUMENTS

FR         2767025 A1 *  2/1999   ........... B65H 75/146

OTHER PUBLICATIONS

Machine Translation of FR 2 767 025 A1, Feb. 12, 1999. (Year: 1999).*

* cited by examiner

*Primary Examiner* — William E Dondero
(74) *Attorney, Agent, or Firm* — Michael E. McKee

(57) ABSTRACT

An item and an associated method utilizing an elongated core defining an outer surface having a series of axially-disposed regions about which windable materials can be wound involves anchoring locations at which the terminal ends of windable materials are anchorable. The series of regions are arranged along the core of the item in a sequential fashion with a first region being disposed adjacent a first end of the core, and the anchoring location of each subsequent region in the series of regions subsequent to the first region is circumferentially spaced about the outer surface of the core from the anchoring location of the region which immediately precedes the subsequent region by a predetermined distance and in a circumferential direction therealong which is opposite the direction in which the item is rotated during a material unwinding process.

21 Claims, 9 Drawing Sheets

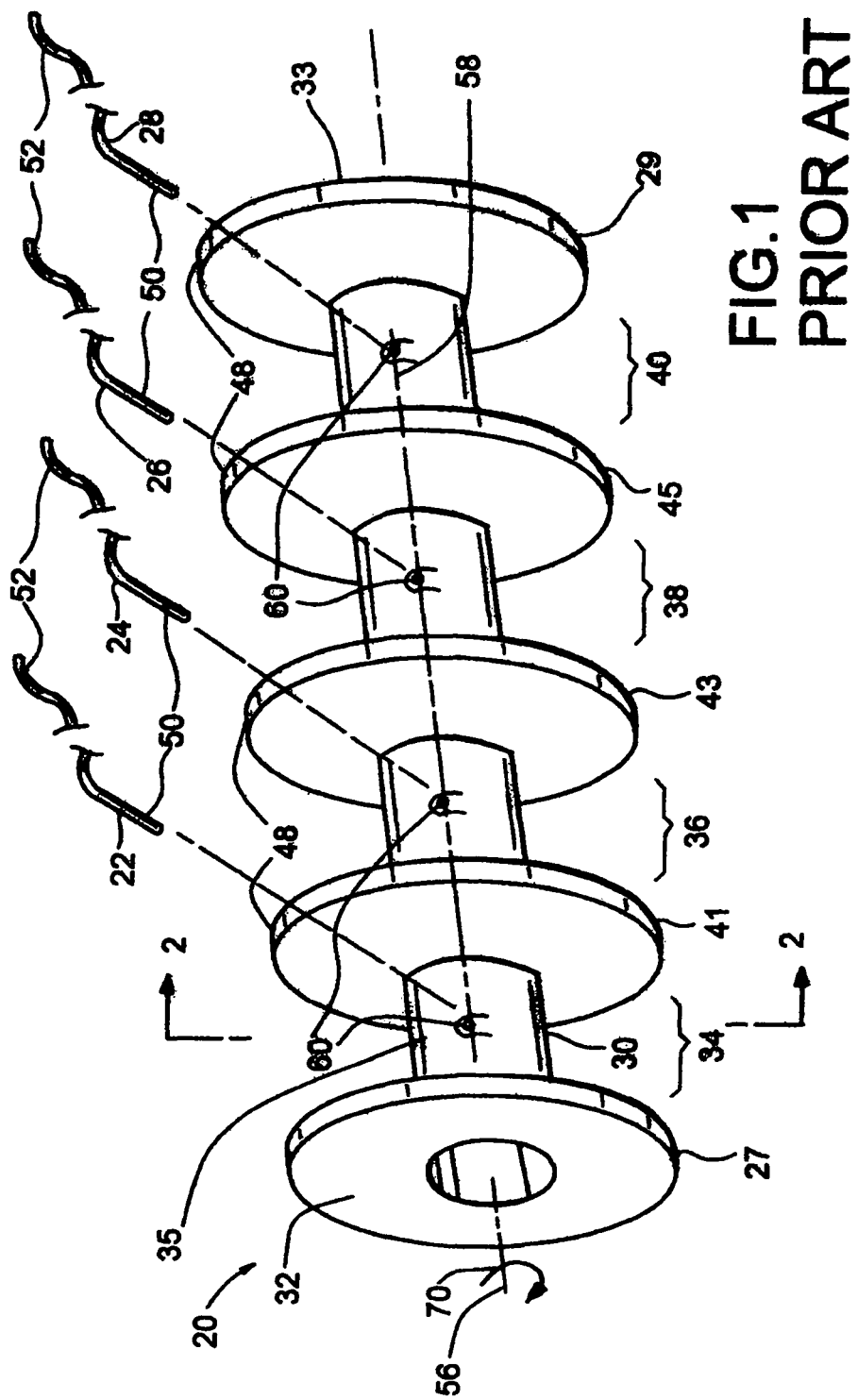

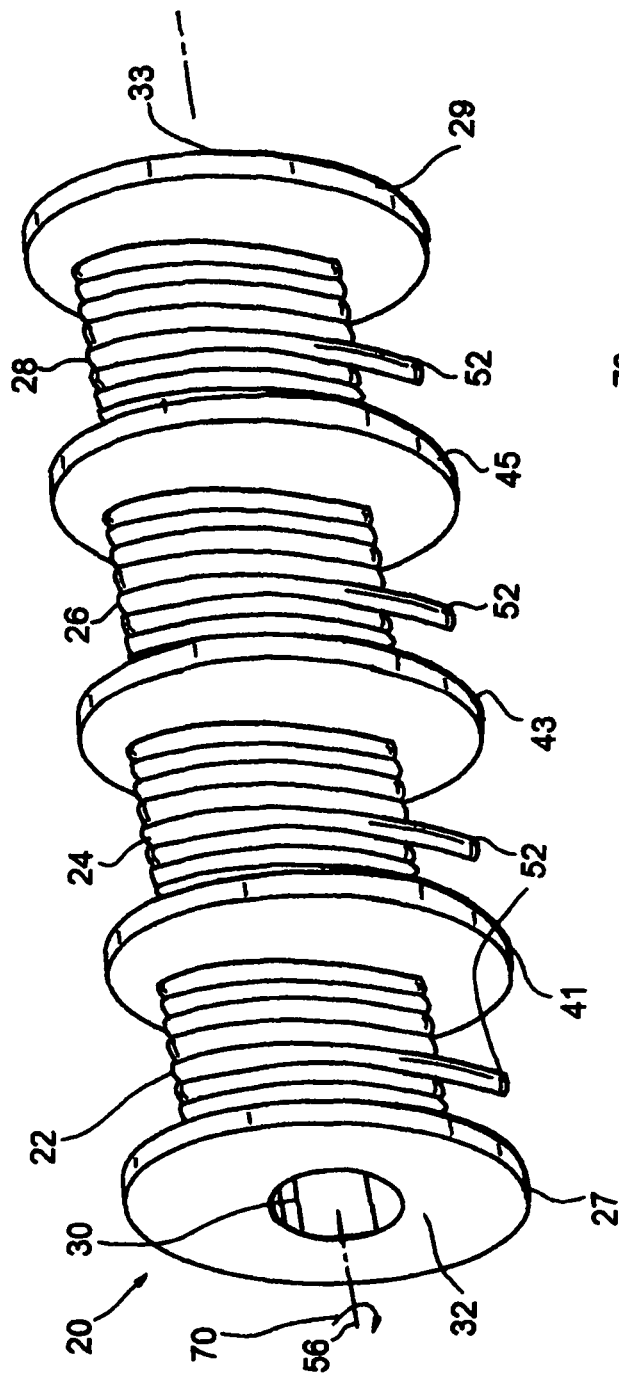
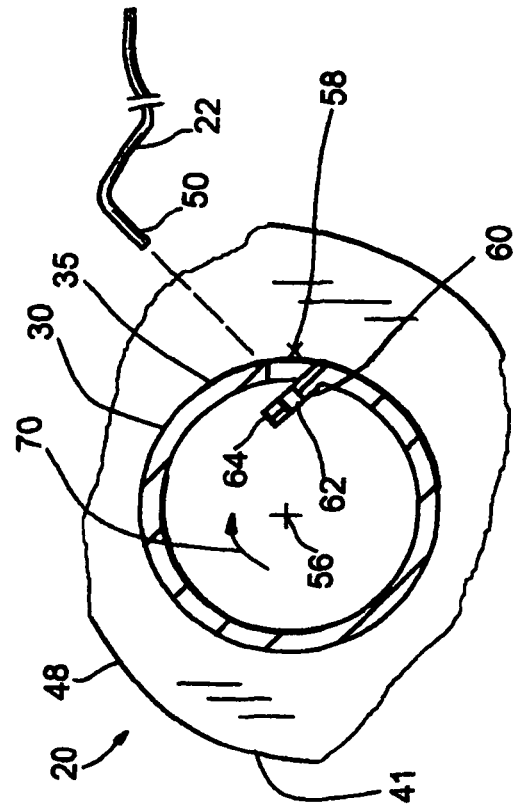
FIG.3 PRIOR ART
FIG.2 PRIOR ART

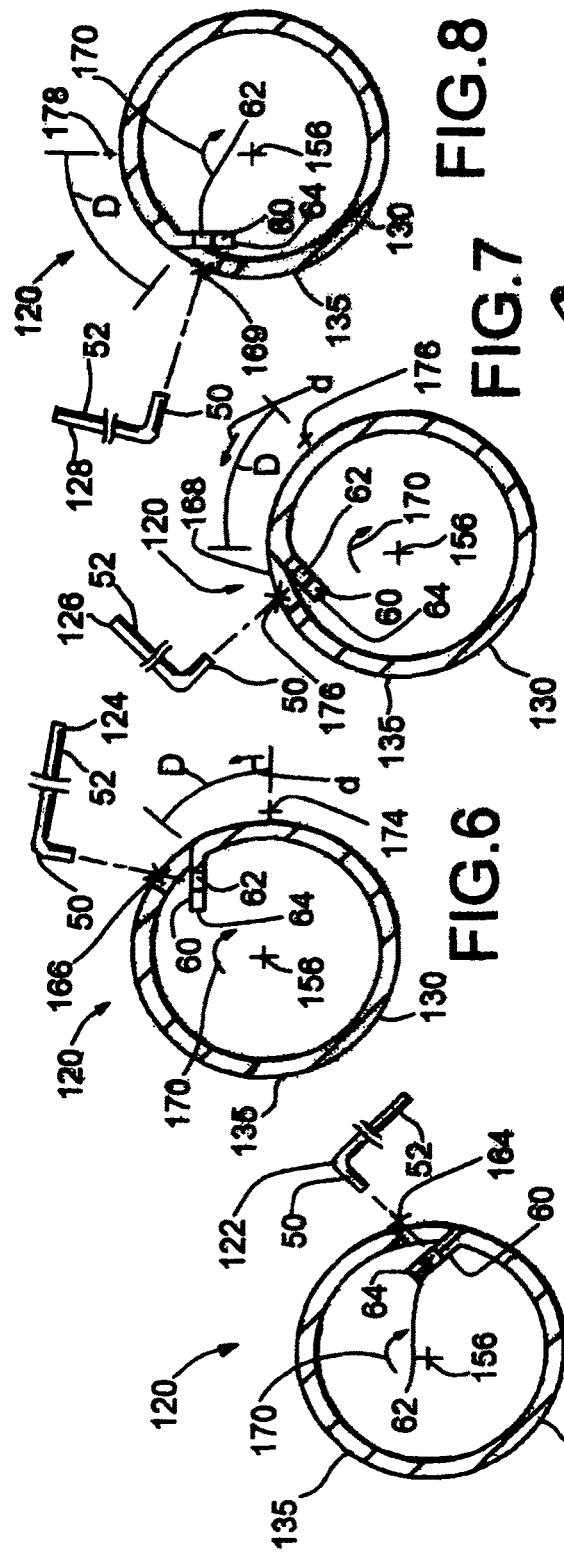
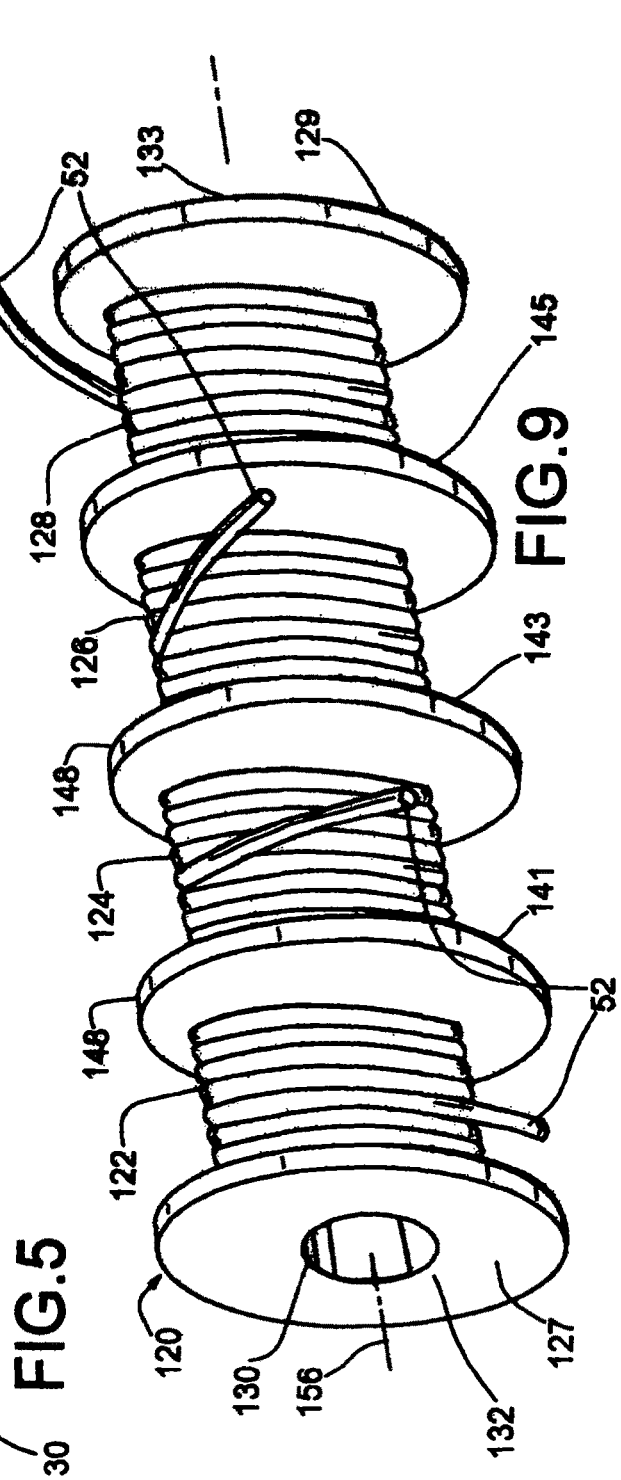
FIG. 5 FIG. 6 FIG. 7 FIG. 8 FIG. 9

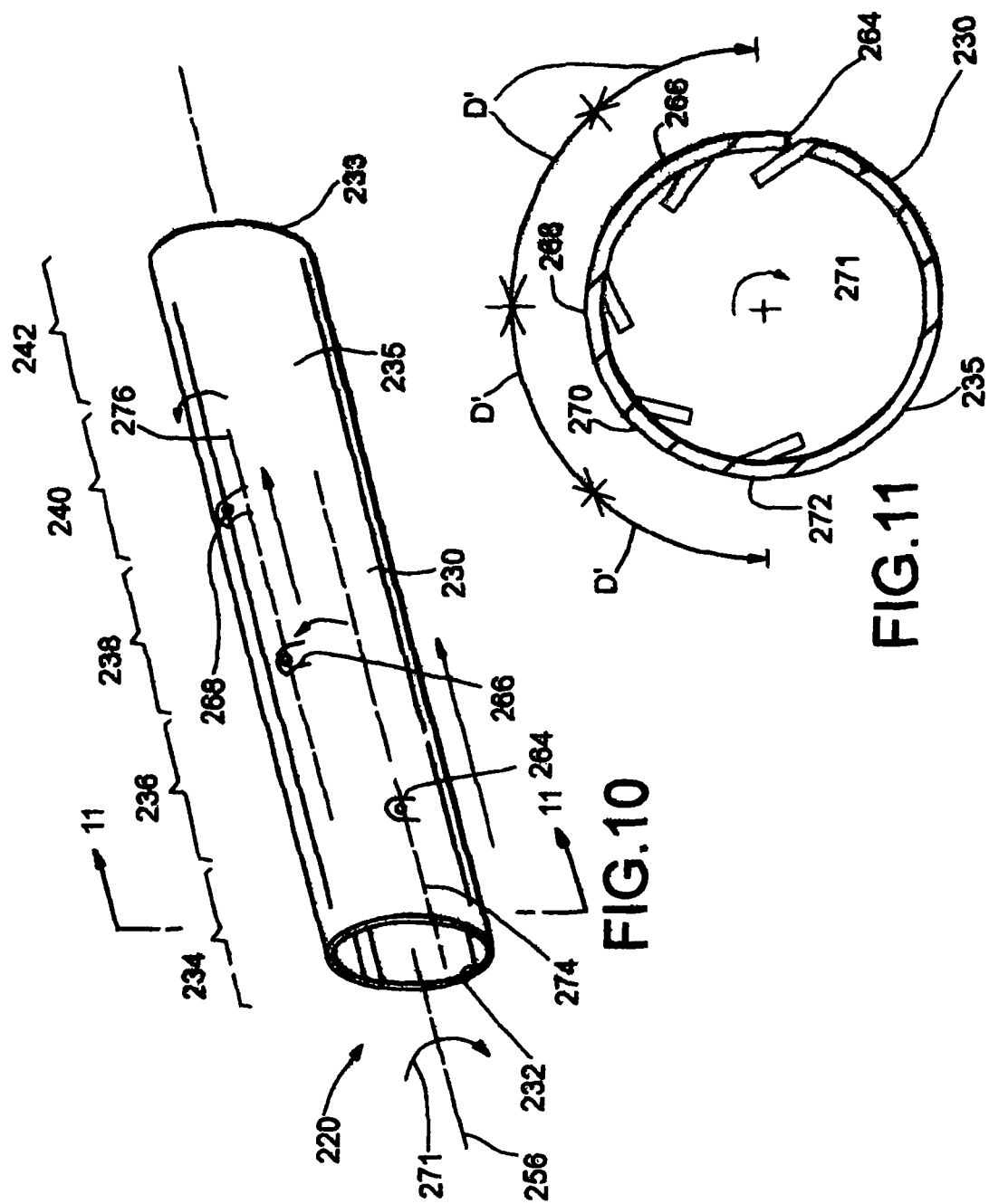

US 11,177,637 B1

CORE-INCLUDING ITEM PROVIDED WITH STAGGERED ANCHORING LOCATIONS FOR HOLDING WINDABLE MATERIAL AND ASSOCIATED METHOD

BACKGROUND OF THE INVENTION

This invention relates generally to items utilizing a core for holding multiple windable materials wound thereabout and relates, more particularly, to such an item to which the terminal ends of the multiple windable materials are anchored for purposes of winding the materials about the core and an associated method of anchoring the multiple windable materials to the item.

The class of items with which this invention is concerned includes reels, spools and drums having a core about which multiple wires or cables can be wound and from which the wires or cables can be unwound simultaneously during, for example, the installation of the wires or cables within the conduit of a building by way of a wire or cable-pulling operation. During such an installation process, one end, or the free end, of each wire or cable wound about the core and to be pulled through a conduit is commonly connected to a lanyard assembly having a lanyard and a connector body about which the free end of the wire or cable is secured, or crimped, and then all of the lanyard assemblies, with the wires or cables attached, are pulled through the conduit in a group while the wires or cables are pulled from the item. An example of lanyard assemblies of the aforedescribed class are available from iToolco of Oak Ridge, Tenn. under the trade designation WINDOW CRIMP.

Heretofore, the securement of multiple wires (or cables) to lanyard assemblies of the aforedescribed class for wire-pulling purposes commonly necessitates that a length of wire be cut from one or more of the multiple wires to ensure that when the wires are pulled or unwound from the core of the item, the wires will be pulled from the item evenly. However, a disadvantage associated with such a wire-securement technique involving a cutting of the wires in preparation of a wire-pulling operation is that it leads to wire waste.

It would be desirable to provide a new and improved core-including item about which multiple windable materials are wound and which reduces the likelihood that a length of the materials must be cut from the remainder thereof in preparation of a material-pulling operation involving lanyard assemblies.

Accordingly, it is an object of the present invention to provide a new and improved core-including item about which multiple windable materials can be wound or from which the multiple windable materials can be unwound.

Another object of the present invention is to provide such an item which is provided with anchoring locations for the terminal ends of the windable materials wound thereabout which are strategically positioned with respect to one another to reduce the likelihood that a length of (at least one of) the windable materials must be cut, and subsequently scrapped, from the remainder thereof prior to securement of the windable materials to lanyard assemblies in preparation for a material-pulling operation or following a wire-installation process.

Still another object of the present invention is to provide such an item which reduces wire waste.

Yet another object of the present invention is to provide such an item which is uncomplicated in structure, yet effective in operation.

A further object of the present invention is to provide and new and improved method involving the anchoring of a plurality of windable materials to a core-including item.

SUMMARY OF THE INVENTION

This invention resides in an improvement to an item for holding windable materials and an associated method. In this regard, the item includes an elongated core, first and second ends and defining an outer surface having at least two regions disposed axially along the core between the first and second ends and about which windable materials can be wound or from which windable materials can be unwound. In addition, there is associated with each region of the at least two regions a material-anchoring location at which the terminal end of a windable material is anchorable, and the item is adapted to be rotated in one direction about the longitudinal axis of the core during a material unwinding process.

The improvement is characterized in that the at least two regions are arranged along the core of the item so that a first region of the at least two regions is disposed adjacent a first end of the core and a second region of the at least two regions is disposed adjacent the first region. Moreover, the material-anchoring location of the second region of the at least two regions is circumferentially spaced about the outer surface of the core from the material-anchoring location of the first region by a predetermined distance and in a circumferential direction from a path traced axially along the core and which includes the material-anchoring location of the first region and which circumferential direction is opposite the one direction in which the item is rotated during a material unwinding process.

The method of the invention is directed to the anchoring of a plurality of windable materials about a core-including item including an elongated core about which the windable materials are to be wound, and each windable material includes a terminal end which is securable to the core-including item for anchoring the windable materials thereto and an opposite free end. The method includes the steps of securing a first of the plurality of windable materials to the item at a first anchoring location associated with the item and securing a second of the plurality of windable materials to the item at a second anchoring location associated with the item. Moreover, the first and second anchoring locations are disposed in such a positional relationship with respect to one another so that after securing the first and second of the windable materials to the first and second anchoring locations and winding the first and second windable materials about the core of the core-including item, the free ends of the first and second windable materials are circumferentially spaced from one another about the core.

BRIEF DESCRIPTION OF THE DRAWINGS

FIG. 1 is a perspective view of a spool of the prior art and a plurality of wires capable of being wound about the spool.

FIG. 2 is a cross-sectional view taken about along lines 2-2 of FIG. 1 and illustrating a wire whose terminal end is anchorable adjacent the outer surface of the prior art spool of FIG. 1.

FIG. 3 is a perspective view of the prior art spool of FIG. 1, shown with a plurality of wires fully wound thereabout.

FIG. 5 is a cross-sectional view of a first radial plane of the core of the FIG. 4 embodiment taken about along line 5-5 of FIG. 4.

FIG. 6 is a cross-sectional view of a second radial plane of the core of the FIG. 4 embodiment taken about along line 6-6 of FIG. 4.

FIG. 7 is a cross-sectional view of a third radial plane of the core of the FIG. 4 embodiment taken about along line 7-7 of FIG. 4.

FIG. 8 is a cross-sectional view of a fourth radial plane of the core of the FIG. 4 embodiment taken about along line 8-8 of FIG. 4.

FIG. 9 is a perspective view of the FIG. 4 embodiment shown with a plurality of wires fully wound thereabout.

FIG. 10 is a perspective view of a core of an alternative embodiment of the present invention within which features of the present invention are incorporated.

FIG. 11 is a cross-sectional view of the FIG. 10 core taken along line 11-11 of FIG. 10.

DETAILED DESCRIPTION OF AN ILLUSTRATIVE EMBODIMENT

Figure 4:
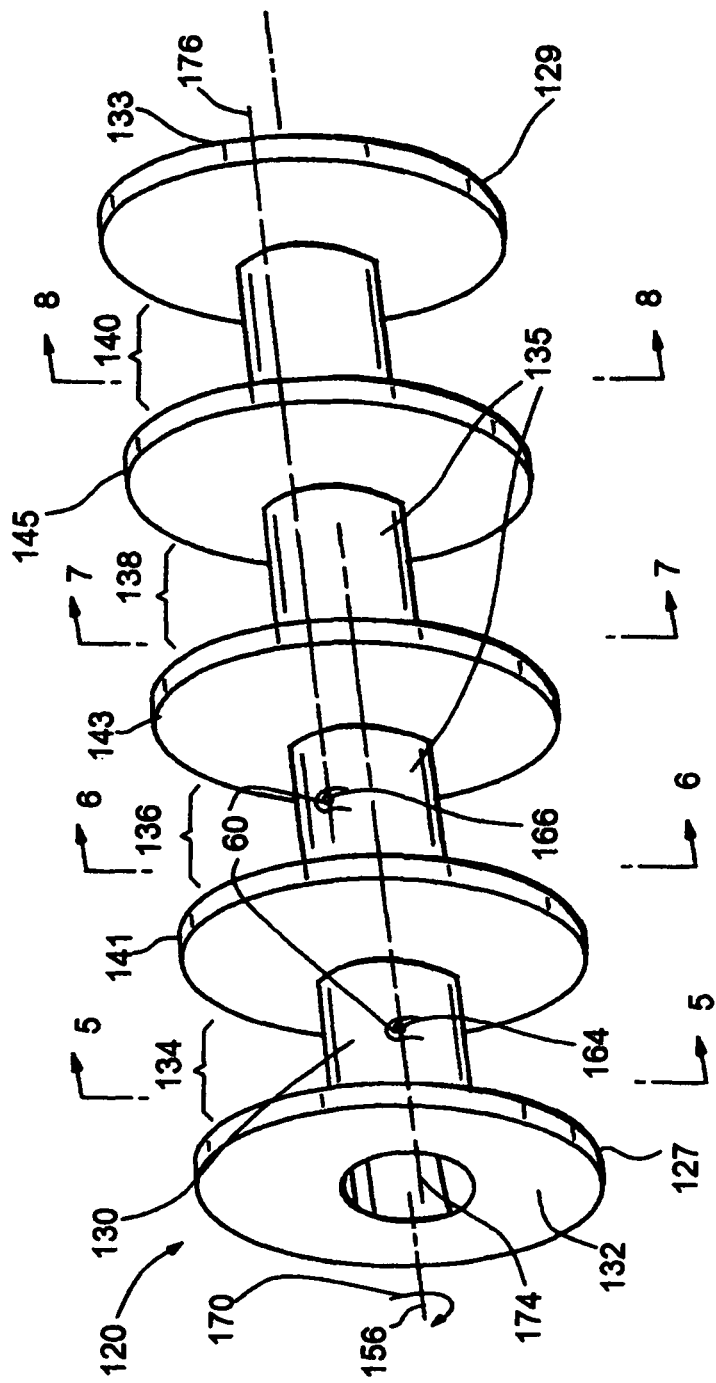
FIG. 4 is a perspective view of an embodiment of a spool within which features of the present invention are incorporated.

Turning now to the drawings in greater detail and considering first FIGS. 1-3, there is illustrated a spool, generally indicated 20, of the prior art about which multiple cable or wires 22, 24, 26, 28 can be wound or from which the wires 22, 24, 26 28 can be unwound. The prior art spool 20 includes an elongated hollow core 30 comprised, for example, of sheet metal having two opposite ends 32, 33, a substantially cylindrically-shaped outer surface 35 and a pair of circular flanges 27, 29 attached to the spool barrel 30 at the ends 32, 33 thereof. The cylindrical surface 35 of the core 30 is provided with multiple (i.e. four) regions, or zones, 34, 36, 38, 40 which are axially-disposed along the length of the core 30 and about which a separate one of the multiple wires 22, 24, 26, 28 can be wound. If desired, each of these axially-disposed regions 34, 36, 38 or 40 can be physically separated from its adjacent region (or regions) by way of intermediate circular flanges 41, 43, 45 which are each secured about the core 30 between adjacent pairs of regions and has a circular outer edge 48 which extends radially of the core 30.

Figure 12:
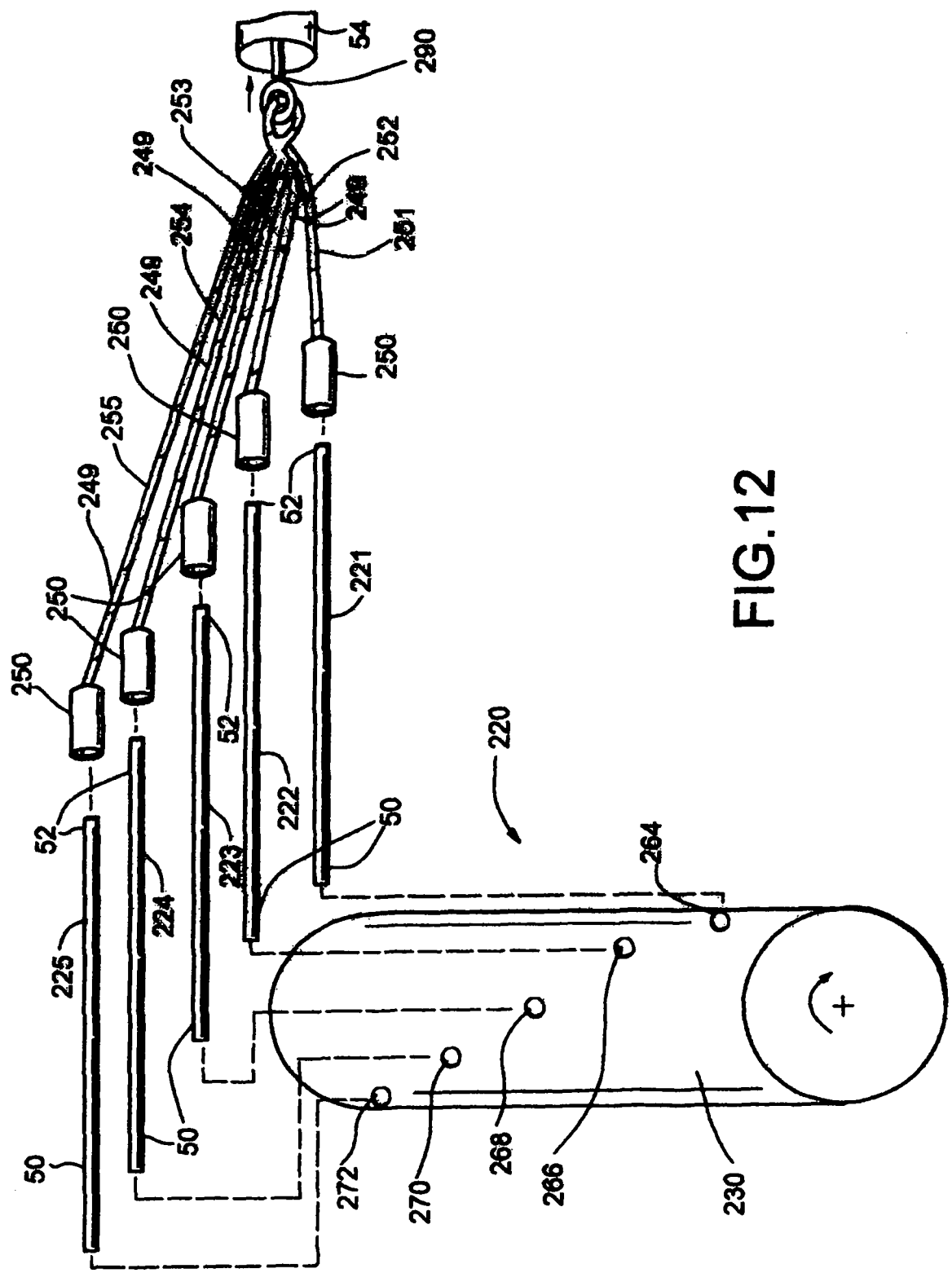
FIG. 12 is a perspective view schematically illustrating the relationship between a plurality of wires being unwound from the core of a spool and being pulled through a conduit by way of a plurality of lanyard assemblies.

As best shown in FIG. 1, each of the multiple wires 22, 24, 26 or 28 includes a proximal, or terminal, end 50 which is secured, or anchored, to the core 30 at a predetermined location along, or adjacent, the surface 35 thereof for holding the wire 22, 24, 26 or 28 at the predetermined location during an operation which winds the wire 22, 24, 26 or 28 about the core 30 to the fully wound condition depicted in FIG. 3. Each of the multiple wires 22, 24, 26 or 28 also includes a distal, or free, end 52 (FIG. 3) which is accessible along the outer windings of the spool 20 when the wires 22, 24, 26 or 28 are wound thereabout to the fully-wound condition of FIG. 3. It is these distal, or free, ends 52 of the wires 22, 24, 26, 28 which are pulled from the spool 20 during a wire-pulling operation which both unwinds the wires 22, 24, 26, 28 from the spool 20 and directs the wires 52-end-first along a desired path such as, for example, through a conduit 54 (FIG. 12). During such a wire-pulling operation, the spool 20 is commonly supported for rotation about the longitudinal axis, indicated 56, of the core 30 so that as the wires 22, 24, 26, 28 are pulled (i.e. unwound) from the spool core 30, the spool 20 is free to rotate about the longitudinal axis 56 of the core 30 in the direction of the FIG. 1 arrow 70.

For purposes of anchoring the terminal ends 50 of each wire 22, 24, 26 or 28 along the cylindrical surface 35 of the core 30, there is provided within each region 34, 36, 38 or 40 of the depicted spool 20 a relatively small tab 60 which defines a central aperture or opening 62 formed therein and which is adapted to accept the terminal end 50 of a corresponding wire 22, 24, 26 or 28 directed endwise therein. Moreover, each tab 60 is formed (e.g. stamped) within the material (e.g. sheet metal) comprising the outer surface 35 of the core 30 so that one end, indicated 64, of each tab 60 is bent somewhat radially inwardly of the cylindrical surface 35, as exemplified by the tab 60 shown in FIG. 2. By inserting the terminal end 50 of a wire 22, 24, 26 or 28 through the central opening 62 of the tab 60 and then pulling the wire taut against the cylindrical surface 35 (i.e. along a direction about the spool core 30 corresponding with the intended direction of rotation of the core 30 during a wire unwinding operation), the wire end 50 is retained within the central opening 62 of the tab 60 by the frictional gripping engagement between the wire 22, 24, 26 or 28 and the edges of the central opening 62 of the tab 60. It follows that when the terminal end 50 of each wire 22, 24, 26 or 28 has been inserted through the central opening 62 of a corresponding tab 60, and the spool 20 is thereafter rotated about the core axis 56 in the direction opposite the FIG. 1 arrow 70—which direction 70 corresponds with the intended direction of rotation of the spool 20 during a wire unwinding process, the wires 42, 44, 46, 48 are wound simultaneously about the spool core 30.

Within the prior art spool 20 of FIGS. 1-3, the tabs 60 provide the locations along the cylindrical surface 35 of the core 30 at which the terminal ends 50 of the wires 22, 24, 26, 28 are intended to be anchored, and these tabs 60 are arranged along a path which extends axially along the cylindrical surface 35 of the core 30. Stated another way and as best shown in FIG. 1, the tabs 60 of the prior art spool 30 are arranged along an imaginary line 58 (FIGS. 1 and 2) traced across the cylindrical surface 35 of the core 30 and which is substantially parallel to the longitudinal axis 56 of the spool core 30. (Within the FIG. 2 view, the aforementioned imaginary line 58 extends normal, or perpendicular, to the drawing sheet bearing FIG. 2.)

As used herein, the term "core" is intended to include the component of any of a number of items, such a spool, a reel or drum, about which a windable material, such as a wire or cable, is wound for material-carrying purposes.

With reference to FIGS. 4-9, there is illustrated an embodiment, generally indicated 120, of a spool within which features of the present invention are incorporated. The spool 120 includes an elongated hollow core 130 comprised, for example, of sheet metal, having two opposite ends 132, 133, a substantially cylindrically-shaped outer surface 135 and a pair of flanges 127, 129 attached to the spool barrel 130 at the ends 132, 133 thereof. The cylindrical surface 135 of the core 130 is provided with multiple (i.e. four) regions, or zones 134, 136, 138, 140, which are axially-disposed along the length of the core 130 and about which the multiple wires 122, 124, 126, 128 (FIGS. 5-9) are wound. In other words, each region 134, 136, 138 or 140 provides a section of the core 130 about which a separate one of the wires 122, 124, 126 or 128 can be wound. If desired, each of these axially-disposed regions 132, 134, 136 or 138 can be physically separated from its adjacent region (or regions) by way of flanges 141, 143 or 145 which are each secured about the core 130 between adjacent pairs of regions and has a circular outer edge 148 (FIG. 9) which extends radially of the core 130.

As best shown in FIGS. 5-8 and as do the wires 22, 24, 26, 28 of FIGS. 1-3, each of the multiple wires 122, 124, 126 or 128 includes a proximal, or terminal, end 50 which is secured, or anchored, to the core 130 at a predetermined location therealong for holding the wire 122, 124, 126 or 128 at the predetermined location during an operation which winds the wire 122, 124, 126 or 128 about the core 130 to the fully wound condition depicted in FIG. 9. Each of the multiple wires 122, 124, 126 or 128 also includes a distal, or free, end 52 which is accessible along the outer windings of the spool 120 when the wires 122, 124, 126 or 128 are wound thereabout to the fully-wound condition of FIG. 9. It is these distal, or free, ends 52 of the wires 122, 124, 126, 128 which are pulled from the spool 120 during an operation which both unwinds the wires 122, 124, 126, 128 from the spool 120 and directs the wires 52-end-first along a desired path such as, for example, through a conduit 54 (FIG. 12). During such a wire-pulling operation, the spool 132 can be supported for rotation about the longitudinal axis, indicated 156, of the core 130 so that as the wires 122, 124, 126, 128 are pulled (i.e. unwound) from the spool core 130, the spool 120 is free to rotate about the longitudinal axis 156 of the core 130.

For purposes of anchoring the terminal end 50 of each wire 122, 124, 126 or 128 along the cylindrical surface 135 of the core 30, there is provided within each region 134, 136, 138 or 140 of the depicted spool 120 a relatively small tab 60 which defines a central aperture or opening 62 formed therein and which is adapted to accept the terminal end 50 of a corresponding wire 122, 124, 126 or 128 directed endwise therein. Moreover, each tab 60 is formed (i.e. stamped) within the material of the outer surface 135 of the core 130 so that one end, indicated 64, of each tab 60 is bent somewhat radially inwardly of the cylindrical surface 135, as exemplified by the tab 60 shown in FIG. 5. By inserting the terminal end 50 of a wire 122, 124, 126 or 128 through the central opening 62 of the tab 60 and then pulling the wire taut along the outer surface 135 of the core 130, the wire end 50 is retained within the central opening 62 of the tab 60 by the frictional gripping engagement between the outer surfaces of the wire 124, 124, 126 or 128 and the inside edges of the central opening 62 of the tab 60.

However and unlike the tabs 60 of the spool 20 of FIGS. 1-3, the tabs 60 of the spool 120 of FIGS. 4-9 are not disposed along a linear path which extends axially along the length of the cylindrical surface 135. Instead, the locations of the tabs 60 of the spool 120 are arranged in a staggered, rather than linear, arrangement as a path is traced axially along the cylindrical surface 135 of the spool core 130 from one end 132 toward the other end 133 thereof. More specifically and with reference again to FIGS. 4-8, once the (first) location, indicated 164, along the core surface 135 has been selected, or established, for the tab 60 of the first axial region 134, the (second) location, indicated 166, is selected for the tab 60 of the second axial region 136 wherein the (second) location 166 is spaced circumferentially from the location 164 of the first axial region 134 by a predetermined distance D (FIG. 6) and in a direction about the circumference of the core surface 135 which is opposite the direction (indicated by the FIG. 4 arrow 170) of rotation of the spool core 130 during a wire unwinding process. That is to say that the (second) location 166 is spaced circumferentially from an imaginary line, indicated 174 in FIGS. 4 and 6 traced axially along the core surface 135 through the (first) location 164 of the first region 134 and in a direction about the circumference of the core surface 135 indicated by the FIG. 6 arrow d from the imaginary line 174, which direction d is opposite the direction (indicated by the FIG. 4 arrow 170) of intended rotation of the spool core 130 during a wire unwinding process. (Within the FIG. 6 view, the aforementioned imaginary line 174 extends normal, or perpendicular, to the drawing sheet bearing FIG. 6.)

Similarly, once the (second) location 166 along the core surface 135 has been selected, or established, for the tab 60 of the second axial region 136, the (third) location, indicated 168 in FIG. 7, is selected for the tab 60 of the third axial region 138 wherein the location 168 is spaced circumferentially from the location 166 of the second axial region 136 by the predetermined distance D (FIG. 7) and in a direction about the circumference of the core surface 135 which is opposite the intended direction (indicated by the FIG. 7 arrow 170) of rotation of the spool core 130 during a wire unwinding process. That is to say that the (third) location 168 is spaced circumferentially from an imaginary line, indicated 176 in FIGS. 4 and 7 traced axially along the core surface 135 through the (second) location 166 of the second region 136 and in a direction d from the imaginary line 176 which is opposite the intended direction (indicated by the FIG. 7 arrow 170) of rotation of the spool core 130 during a wire unwinding process. (Within the FIG. 7 view, the aforementioned imaginary line 176 extends normal, or perpendicular, to the drawing sheet bearing FIG. 7.)

Similarly again, once the (third) location 168 along the core surface 135 has been selected, or established, for the tab 60 of the third axial region 138, the (fourth) location, indicated 169 in FIG. 8, is selected for the tab 60 of the fourth axial region 140 wherein the location 169 is spaced circumferentially from the location 168 of the third axial region 138 by the predetermined distance D (FIG. 8) and in a direction about the circumference of the core surface 135 which is opposite the direction (indicated by the FIG. 8 arrow 170) of rotation of the spool core 130 during a wire unwinding process. That is to say that the (fourth) location 169 is spaced circumferentially from an imaginary line, indicated 178 in FIG. 8, traced axially along the core surface 135 through the (third) location 168 of the third region 138 and in a direction from the imaginary line 178 which is opposite the direction (indicated by the FIG. 8 arrow 170) of rotation of the spool core 130 during a wire unwinding process. (Within the FIG. 8 view, the aforementioned imaginary line 178 extends normal, or perpendicular, to the drawing sheet bearing FIG. 8.)

It follows that the axially-disposed regions 134, 136, 138, 140 provide a series of regions which are arranged along the core 130 of the spool 120 in a sequential fashion so that as a path is traced axially along the outer surface 135 of the core 130 from the first end 132 thereof, a first region 134 of the series of regions is disposed adjacent the first end 132 of the core 130 and each region 136, 138 or 140 of the series of regions subsequent to the first region 134 is disposed adjacent the region 134, 136 or 138 which immediately precedes the subsequent region 136, 138 or 140. In addition, the material-anchoring location 166, 168 or 169 of each subsequent region 136, 138 or 140 in the series of regions subsequent to the first region 134 is circumferentially spaced about the outer surface 135 of the core 130 from the material-anchoring location 164, 166 or 168 of the region which immediately precedes the subsequent region 136, 138 or 140 by a predetermined distance D and in a circumferential direction thereabout which is opposite the one direction (indicated by the arrow 170) in which the spool 120 is rotated during a material unwinding process. It also follows that the material-anchoring location 166, 168 or 169 disposed within each axial region 136, 138 or 140 following the first axial region 134 is dependent upon the establishment of the material-anchoring location 164 of the first axial region 134.

With reference to FIGS. 10 and 11, there is schematically illustrated a core 230, of another embodiment of of a spool 220 within which features of the present invention are incorporated. More specifically, the spool core 230 includes two opposite ends 232, 233, a longitudinal axis 256 about which the spool 220 can be rotated during a wire winding or wire unwinding process and a plurality of (i.e. five) regions 234, 236, 238, 240, 242 disposed in a sequential arrangement along the length of the core 230 as a path is traced axially along the outer surface 235 of the core 230 from the first end 232 thereof. Meanwhile, the wire-anchoring location of the first region 234 is indicated 264, and the wire-anchoring location, indicated 266, of the second axial region 236 is circumferentially spaced about the core surface 235 from the (first) location 264 by a distance D' and in the direction therefrom (i.e. from an imaginary line 274 drawn through the first location 264 and axially along the circumferential surface 230) which is opposite the direction (indicated by the arrow 271) of rotation of the core 230 during a wire unwinding operation.

Similarly, the wire-anchoring location, indicated 268, of the third axial region 238 is circumferentially spaced about the wire surface 230 from the (second) location 266 by a distance D' and in the direction therefrom (i.e. from an imaginary line 276 drawn through the (second) location 266 and axially about the circumferential surface 230) which is opposite the direction (indicated by the arrow 271) of rotation of the core 230 during a wire unwinding operation. Similarly again, the wire-anchoring location, indicated 270, of the fourth axial region 240 is circumferentially spaced about the core surface 235 from the (third) location 268 by a distance D' and in the direction therefrom (i.e. from an imaginary line drawn through the (third) location 268 and axially along the circumferential surface 230) which is opposite the direction (indicated by the arrow 271) of rotation of the core 230 during a wire unwinding operation. Similarly still further, the wire-anchoring location, indicated 272 in FIG. 11, of the fifth axial region 242 is circumferentially spaced about the core surface 235 from the (fourth) location 270 by a distance D' and in the direction therefrom (i.e. from an imaginary line drawn through the (fourth) location 270 and axially along the circumferential surface 230) which is opposite the direction (indicated by the arrow 271) of rotation of the core 230 during a wire unwinding operation.

Within the spool 220 of FIGS. 10 and 11, each wire-anchoring location 264, 266, 268, 270 or 272 of the axially-disposed regions 234, 236, 238, 240 or 242 is disposed centrally within its corresponding region (i.e. substantially midway between the two side, or width, boundaries) of the region) and the wire-anchoring locations are equally spaced from one another as a path is traced axially along the core surface 235, but the wire-anchoring locations need not be centrally disposed within its corresponding region nor need they be axially spaced equidistant from one another in the broader aspects of this invention. For example, the wire-anchoring locations could each be located adjacent one side, or width, boundary of its corresponding axial region. Further still, the axially-disposed regions of a single core could possess different widths meaning that even if the wire-anchoring locations of each of such regions were disposed centrally of its width, the distance between the wire-anchoring locations of adjacent regions which possess different widths would not be the same.

The use of the exemplary spool 220 of FIGS. 10 and 11 will now be described in connection with a wire-pulling operation involving the simultaneous pulling of multiple wires through the conduit 54 of FIG. 12. In particular and with reference to FIG. 12, the spool 220 is provided with the aforedescribed wire-anchoring locations 264, 266, 268, 270 and 272 to which the terminal ends 50 of wires 221, 222, 223, 224, 225 are anchored, and the distal, or free, ends 52 of the wires 221, 222, 223, 224, 225 are secured (i.e. crimped) within the connector body 250 of a corresponding lanyard assembly 251, 252, 253, 254 or 255. Each lanyard assembly 251, 252, 253, 254 or 255 is of a class of lanyard assemblies which are known in the art and include a connector body 250 within which the end 52 of a corresponding wire 221, 223, 224 or 225 is inserted (and subsequently crimped) and a lanyard 249 which is joined to so as to extend from the connector body 250 from an end thereof opposite the end into which the wire terminal end 52 is inserted. An example of a known lanyard assembly of the aforedescribed class is currently available from iToolco of Oak Ridge, Tenn. under the trade designation WINDOW CRIMPS.

The wires 221, 222, 223, 224 and 225 are of equal length and when wrapped about the core 230 of the spool 220 (with the terminal ends thereof anchored, respectively, at anchoring locations 264, 266, 268, 270 and 272), the distal ends 52 of the wires will be accessible from the spool 220 in a staggered fashion. That is to say, that upon winding the wires 221, 222, 223, 224, 225 about the core 235 of the spool 220 to the fully wound condition thereabout (such as, for example, the fully-wound spool 120 of FIG. 9), the distal ends 52 are circumferentially spaced about the spool core 230 in staggered, or spaced-apart, intervals which are about equal in length to about the circumferential spacing between adjacent wire-anchoring locations 264, 266, 268, 270, 272 disposed about the core surface 230.

Once the distal ends 52 of the wires 221, 222, 223, 224, 225 have been crimped within the connector bodies 250 of the lanyard assemblies 251, 252, 253, 254, 255 of the lanyard assemblies, the lanyards 249 of the assemblies 251, 252, 253, 254 and 255 are gathered together and pulled as a group by way of, for example, a rope 290 through the conduit 54. Meanwhile, the diameters of the connector bodies 250 of the lanyard assemblies 251, 252, 253, 254, 255 are commonly too large to permit the connector bodies 250 to easily pass through the conduit 54 if the bodies 250 are arranged in a side-by-side, or overlapping, relationship. Consequently, the lanyards 249 of the lanyard assemblies 251, 252, 253, 254, 255 are of different lengths so that when pulled from the ends thereof) opposite the connector bodies 250 through the conduit 54, the connector bodies 250 enter the conduit 54 one-at-a-time and thus do not overlap one another. It follows that in order for the connector bodies 250 not to overlap one another, the difference in lengths between the lanyards of adjacent lanyard assemblies is preferably at great as the length of the connector bodies 250 of the lanyard assemblies involved.

It also follows that the circumferential spacing D' (FIG. 11) between adjacent wire-anchoring locations 264, 266, 268, 270, 272 is at least as great as the length of the connector bodies 250 of the lanyard assemblies 251, 252, 253, 254, 255. That being the case, the length of the wires 221, 222, 223, 224, 225 (as measured between the terminal ends 50 and the distal ends 52 thereof) will be substantially equal. Furthermore and considering the fact that the length of the connector bodies of common lanyard assemblies fall within the range of between three inches and twelve inches, it is preferred that the circumferential spacing D' between adjacent wire-anchoring locations 264, 266, 268, 270, 272 also fall within the range of between about three inches and twelve inches. For the sake of standardization, the inventors envision the circumferential spacing D' between adjacent wire-anchoring locations 264, 266, 268, 270, 272 is about four inches for spools whose cores are intended to hold wires or cables of relatively small diameter and is about seven inches for spools whose cores are intended to hold wires or cables of larger diameter.

To reiterate, the advantage provided by the aforedescribed staggered relationship of the wire-anchoring locations 264, 266, 268, 270, 272 provided about the outer surface 235 of a spool core 230 is that upon winding multiple wires 221, 222, 223, 224 and 225 of equal length about the spool core 230, the distal, or free, ends 52 of the wires will also be staggered. With the wires 221, 222, 223, 224 and 225 wound about the core 230 in such a fashion, the free end 52 of each wire 221, 222, 223, 224 or 225 can be secured within the connector body 250 of a corresponding lanyard assembly 251, 252, 253, 254 or 255 with no need that the free ends 52 be trimmed to ensure that during a wire-pulling operation involving the lanyard assemblies 251, 252, 253, 254, 255, the wires 221, 222, 223, 224 and 225 will be pulled evenly from the spool core 230. Therefore and with little or no need for removing a section, or length, of each wire 221, 222, 223, 224 and 225 from the remainder thereof when securing the wires to the lanyard assemblies, the less chance of wire waste; and the staggered relationship of the wire-anchoring locations 264, 266, 268, 270 along the core surface 235 is advantageous in this respect.

It will be understood that numerous modifications and substitutions can be had to the aforedescribed embodiments 120 and 220 without departing from the spirit of the invention. For example, although the aforedescribed embodiments 120, 220 have been shown and described as being provided with wire-anchoring locations in the form of tabs 60 having an aperture or opening 62 through which the terminal end 50 of a wire can be inserted for frictional gripping engagement therewith, the wire-anchoring locations of a spool can be embodied in alternative forms.

Figure 13:
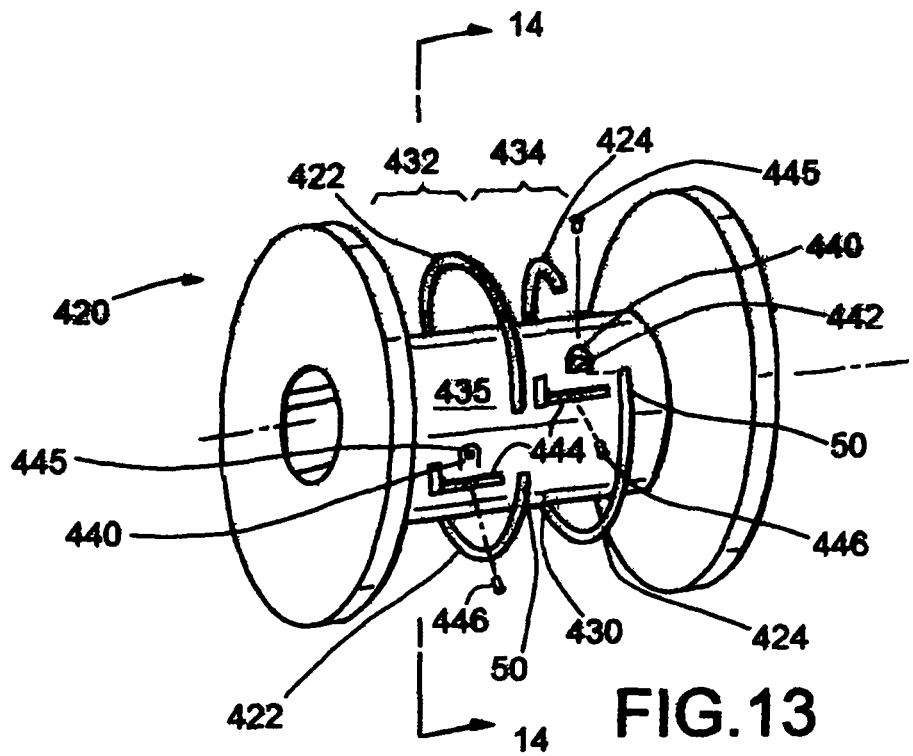
FIG. 13 is a perspective view of still another embodiment of a spool having a core within which features of the present invention are incorporated, shown exploded.
Figure 14:
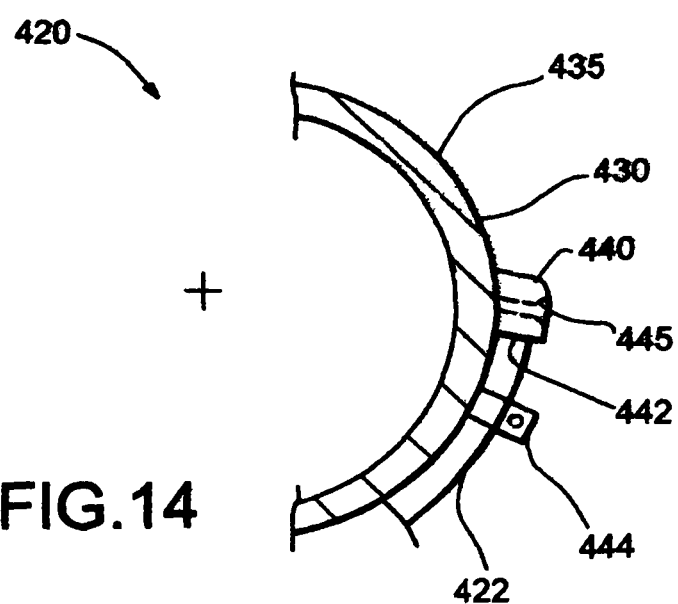
FIG. 14 is a cross-sectional view of a fragment of the FIG. 13 spool taken about along line 14-14 of FIG. 13.

For example, there is illustrated in FIGS. 13 and 14 a wooden spool 420 having an elongated core 430 having a plurality of (e.g. two) axially-disposed regions 432, 434 about which a plurality of (e.g. two) wires 422, 424 can be wound or from which the wires 422, 424 can be unwound. Each axially-disposed region 422 or 424 of the FIG. 13 spool 420 includes a boss 440 having an abutment surface 442 against which the terminal end 50 of a wire 422 or 424 can be placed in abutting relationship and an anchoring strap 444 for securement of the wire 422 or 424 adjacent the outer surface, indicated 435, of the core 430. Each boss 440 is secured to the outer surface 435 of the core 430 with a screw 445. In addition, each anchoring strap 444 is secured to the surface 135 of the core 430 with a screw 446 and is positioned adjacent the abutment surface 442 of a corresponding boss 440 so that after positioning the terminal end 50 of a wire 422 or 424 against the abutment surface 442 of the boss 440, the strap 444 can be securely wrapped about the wire 422 or 424 (e.g. in the manner of a zip tie) to hold the terminal end 50 of the wire 422 or 424 against the boss 440.

Figure 15:
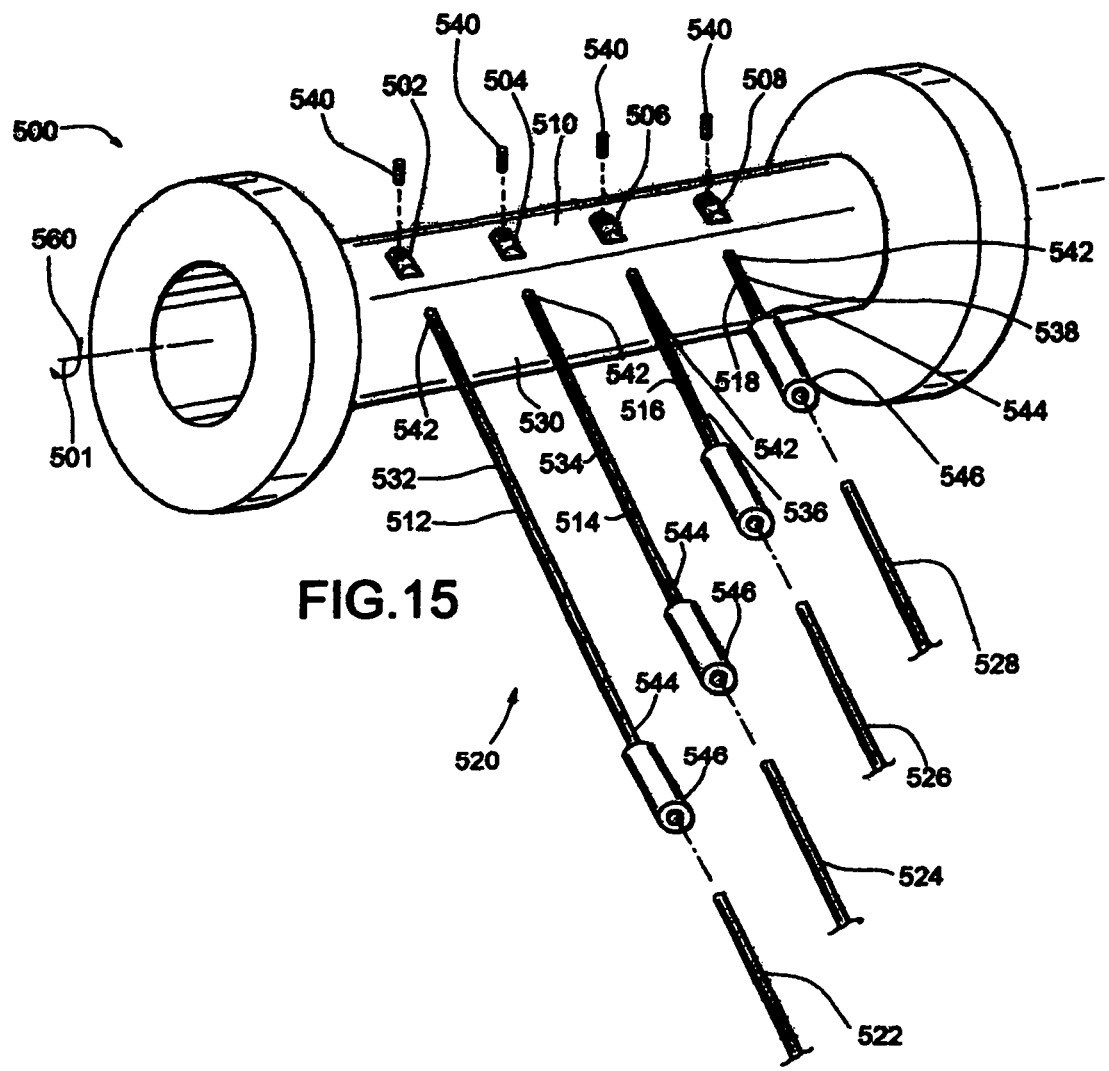
FIG. 15 is a perspective view of yet another embodiment of a core-including spool within which features of the present invention are incorporated, shown exploded, and a plurality of wires which are anchorable to the spool.
Figure 17:
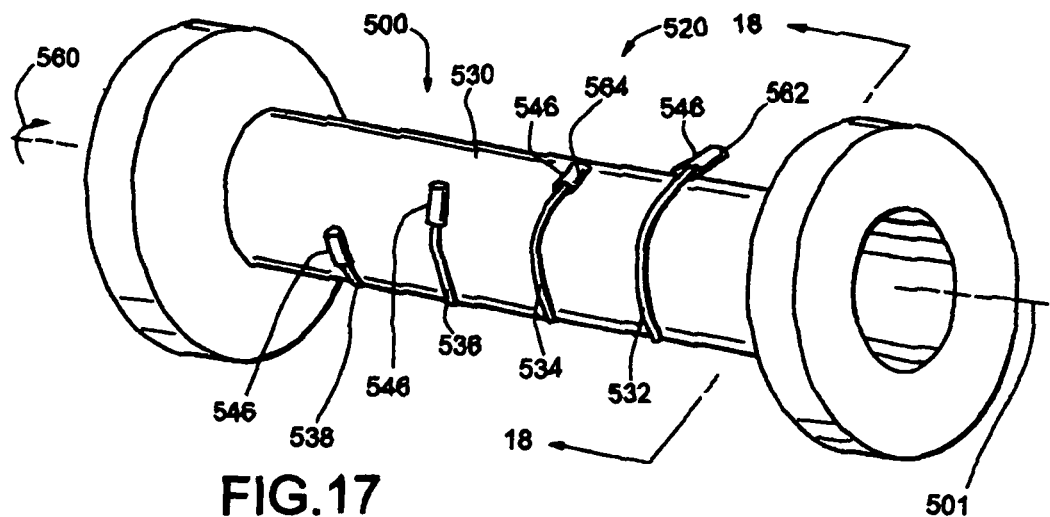
FIG. 17 is a perspective view of the FIG. 15 spool embodiment, shown assembled and from an alternative angle.
Figure 18:
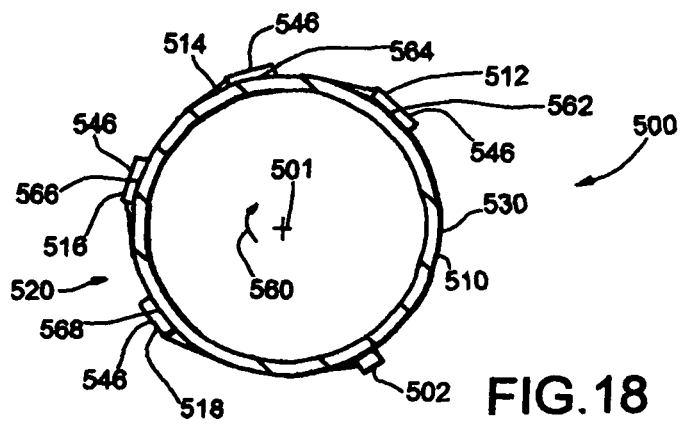
FIG. 18 is a cross-sectional view of the FIG. 15 spool embodiment taken about along lines 18-18 of FIG. 17.

As a further example, there is illustrated in FIGS. 15, 17 and 18 a spool 500 having an elongated, cylindrically-shaped core 530 having an arrangement of attachment locations 502, 504, 506 and 508 arranged along the surface, indicated 510, of the core 530 in a path extending substantially linearly along the length of the surface 510 of the core 530 and substantially parallel to the longitudinal axis, indicated 501, of the core 530. In addition, there is associated with the core 530 anchor-providing means, generally indicated 520, which include a plurality of lanyard assemblies 512, 514, 516 and 518 which are each joined to the core 530 at a corresponding attachment location 502, 504, 506 or 508 and which provide the spool 500 with anchoring locations (described herein) at which wires 522, 524, 526 and 528 are anchored for purposes of winding the wires 522, 524, 526 and 528 about the core 530.

In connection with the foregoing, each lanyard assembly 512, 514, 516 or 518 includes a tension, or lanyard, member 532, 534, 536 or 528 (wherein each tension member 532, 534, 536 or 538 includes two opposite ends 542 and 544) and a connector body 546 joined to each tension member 532, 534, 536 or 538. One end 542 of each tension member 532, 534, 536 or 538 is securely attached, as with the depicted set screw 540 or a suitable locking or tie-down arrangement, to the core 530 at a corresponding attachment location 502, 504, 506 or 508 along the core surface 510. Meanwhile, the connector body 546 is connected to each tension member 532, 534, 536 or 538 at the end 544 thereof for providing the spool 500 with a suitable anchor component to which a corresponding wire 522, 524, 526 or 528 can be anchored for the purpose of winding the wires 522, 524, 526 and 528 about the surface 510 of the core 530.

Figure 16:
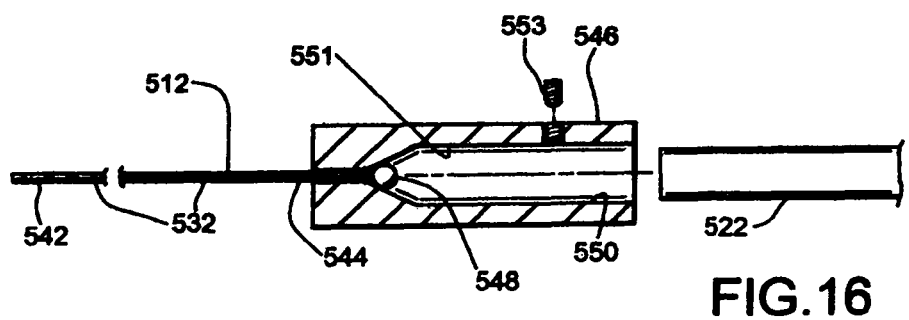
FIG. 16 is a longitudinal cross sectional view of one of the lanyard assemblies utilized in the spool embodiment of FIG. 15.

As exemplified by the lanyard assembly 512 of FIG. 16, much of the structure of each lanyard assembly 512, 514, 516 or 518 resembles that of known lanyard assemblies, such as the aforereferenced WINDOW CRIMP lanyard assemblies, whose end 544 of each tension member 532, 534, 536 or 538 is provided with a bolus 548 and wherein each connector body 546 defines a passageway 551 extending axially therethrough and within which the bolus 548 is captured. Meanwhile, the passageway 551 provides an opening 550 of larger diameter and which opens out of the end of the connector body 546 opposite the end thereof from which the tension member 532, 534, 536 or 538 extends. The opening 550 is sized to accept the end of a corresponding wire 522, 524, 526 or 528 directed endwise therein, and there is provided a set screw 553 which is threadably accepted within a side of the connector body 546 for releasably securing the end of a corresponding wire 522, 524, 526 or 528 within the opening 550.

Furthermore, the lengths of the tension members 532, 534, 536 and 538 are different from one another so that when the tension member ends 542 of the tensions members 532, 534, 536 and 538 are secured to the core 530 at the corresponding attachment locations 502, 504, 506 and 508 and the connector bodies 546 (and tension members 532, 534, 536 and 538) are pulled taut about the surface 510 of the core 530 along the intended direction of rotation, indicated by the direction arrow 560 in FIGS. 15, 17 and 18, of the core 530 during a wire unwinding operation, the connector bodies 546 overlie positions, or locations, adjacent or along the core surface 510 in a desired staggered arrangement. More specifically and with reference to FIGS. 17 and 18, the connector body 546 of the lanyard assembly 512 is disposed at a first location, indicated 562 in FIG. 18, and the connector body 546 of the lanyard assembly 514 is disposed at a second location, indicated 564 in FIG. 18, which is circumferentially spaced about the outer surface 510 of the core 530 from the first location 562 by a predetermined distance and in a circumferential direction from a path, or imaginary line, traced axially along the core surface 510 and which includes the first location 562 and which circumferential direction is opposite the direction, indicated by the FIG. 18 direction arrow 560, in which the spool 500 is intended to be rotated during a wire unwinding process.

Similarly, the connector body 546 of the lanyard assembly 516 is disposed at a third location, indicated 566 in FIG. 18, which is circumferentially spaced about the outer surface 510 of the core 530 from the second location 564 by a predetermined distance and in a circumferential direction from a path, or imaginary line, traced axially along the core surface 510 and which includes the second location 564 and which circumferential direction is opposite the direction, indicated by the FIG. 18 direction arrow 560, in which the spool 500 is intended to be rotated during a wire unwinding process. Similar still, the connector body 546 of the lanyard assembly 518 is disposed at a fourth location, indicated 568 in FIG. 18, which is circumferentially spaced about the outer surface 510 of the core 530 from the third location 566 by a predetermined distance and in a circumferential direction from a path, or imaginary line, traced axially along the core surface 510 and which includes the third location 566 and which circumferential direction is opposite the direction, indicated by the FIG. 18 direction arrow 560, in which the spool 500 is intended to be rotated during a wire unwinding process.

It follows from the foregoing that the locations 562, 564, 566 and 568 along or adjacent the surface of a core of a spool embodying features of the present invention need not be fixedly secured at a particular location along or adjacent the surface of the spool but instead can be provided at the ends, such as at the tension member ends 544, of flexible tension members which are secured adjacent the core surface 510. Accordingly, the principles of the present invention can be variously applied.

Figure 19:
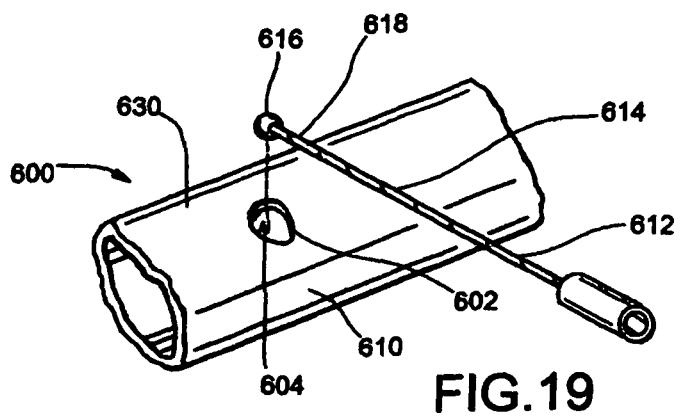
FIG. 19 is a perspective view of a fragment of one more core-including spool within which features of the present invention are incorporated, shown exploded.

Yet further still, there is depicted in FIG. 19 still one more spool 600 within which features of the present invention are embodied wherein the spool 600 includes a core 630 having attachment locations, such as the location indicated 602 in FIG. 19, provided by a teardrop-shaped opening 604 defined within the surface, indicated 610 of the core 630. The spool 600 also includes a lanyard assembly 612 whose tension member 614 includes a bolus 616 which is fixedly secured adjacent one end, indicated 618, thereof for securement of the lanyard assembly 612 adjacent the surface 610 of the core 630 by simply inserting the bolus 616 through the larger portion of the opening 604 to thereby hook the anchor-providing assembly to the core 630. It follows that the bolus 616 is sized to be accepted by the larger portion of the opening 604, but not be able to pass through (i.e. out of) the opening 604 through the smaller portion thereof. It also follows that in accordance with the broader principles of the present invention, the securement of an anchor-providing assembly, such as the lanyard assembly 612, adjacent the surface of a spool core need not require additional attachment componentry, such as screws or bolts.

It follows from the foregoing that a core-including item has been described which provides material-anchoring locations at which a plurality of windable materials of substantially equal length can be anchored and wherein each of the plurality of windable materials includes a terminal end which is anchorable to the item and an opposite free end. The improvement to the core-including item is characterized in that core-including item includes a first anchoring location at which a first of the plurality of windable materials is anchorable and a second anchoring location at which a second of the plurality of windable materials is anchorable. In addition, the first and second anchoring locations are disposed in such a positional relationship with respect to one another so that after securing the first and second of the windable materials to the first and second locations and winding the first and second windable materials about the core of the core-including item, the free ends of the first and second windable materials are circumferentially spaced from one another about the core.

Although the aforedescribed first and second anchoring locations associated with a core-including item has been shown and described as being directly associated with the surface of a core of the item, such anchoring locations can be associated with (e.g. provided along or incorporated within) another component of the core-including item, such as an end flange disposed at one end of the core.

It also follows that an associated method can be employed for anchoring a plurality of windable materials to a core-including item including a core about which the windable materials are to be wound, and each windable material includes a terminal end which is securable to the core-including item for anchoring the windable materials thereto and an opposite free end. The method includes the steps of securing a first of the plurality of windable materials to the item at a first anchoring location associated with the item and securing a second of the plurality of windable materials to the item at a second anchoring location associated with the item. Moreover, the first and second anchoring locations are disposed in such a positional relationship with respect to one another so that after securing the first and second of the windable materials to the first and second anchoring locations and winding the first and second windable materials about the core of the core-including item, the free ends of the first and second windable materials are circumferentially spaced from one another about the core.

Accordingly, the aforedescribed embodiments are intended for the purpose of illustration and not as limitation.

The invention claimed is:

1. In an item for holding windable materials wherein the item includes an elongated core having a longitudinal axis and a first end and a second end and defining an outer surface having at least three regions disposed axially along the core between the first and second ends and about which windable materials can be wound simultaneously or from which windable materials can be unwound simultaneously, wherein the windable material is wound about or unwound from the outer surface as the item is rotated about the longitudinal axis while the longitudinal axis remains substantially stationary and wherein there is associated with each region of the at least three regions a single, and only a single, material-anchoring location at which the terminal end of a windable material is anchorable, and the item is adapted to be supported for rotation in one rotational direction about the longitudinal axis of the core during a material unwinding process involving the movement of material along a path which extends substantially tangentially of the outer surface of the core and substantially normal to the longitudinal axis of the core, the improvement comprising:

the at least three regions are arranged along the core of the item so that a first region of the at least three regions is disposed adjacent a first end of the core, a second region of the at least three regions is disposed adjacent the first region, and a third region of the at least three regions is disposed adjacent the second region, and the single material-anchoring location of the second region of the at least two regions is circumferentially spaced about the outer surface of the core from the single material-anchoring location of the first region by a predetermined distance and in a circumferential direction from a path traced axially along the core and which includes the single material-anchoring location of the first region and which circumferential direction is opposite the one rotational direction in which the item is rotated during a material unwinding process, and the single material-anchoring location of the third region of the at least three regions is circumferentially spaced about the outer surface of the core from the single material-anchoring location of the second region by the predetermined distance and in a circumferential direction from a path traced axially along the core and which includes the single material-anchoring location of the second region and which circumferential direction is opposite the one rotational direction in which the item is rotated during a material unwinding process wherein the predetermined distance is not equal to zero and is less than the circumference of the core so that the material-anchoring locations are not all arranged along a linear path which extends axially along the outer surface of the core.

2. The improvement as defined in claim 1 wherein the at least three regions includes a fourth region which is disposed adjacent the third region, and the single material-anchoring location of the fourth region of the at least two regions is circumferentially spaced about the outer surface of the core from the material-anchoring location of the third region by the predetermined distance and in a circumferential direction from a path traced axially along the core and which includes the single material-anchoring location of the third region and which circumferential direction is opposite the one rotational direction in which the item is rotated during a material unwinding process.

3. The improvement as defined in claim 1 wherein the predetermined distance is within the range of between about three inches and twelve inches.

4. The improvement as defined in claim 1 wherein each region of the at least three regions includes two side boundaries and the single material-anchoring location of each region is disposed substantially midway between the two side boundaries of the region.

5. The improvement as defined in claim 1 wherein each material-anchoring location includes a connector body portion defining an opening in one end thereof through which the terminal end of a windable material can be inserted axially therein and within which the terminal end of the windable material is fixedly secured for purposes of anchoring the terminal end of the windable material to the core at the material-anchoring location and so as to prevent the withdrawal of the terminal end of the windable material from the connector body.

6. The improvement as defined in claim 1 wherein each material-anchoring location is provided with an abutment surface against which the terminal end of a windable material is positionable when the windable material is anchored to the outer surface of the core.

7. The improvement as defined in claim 1 wherein there is associated with each region of the at least three regions a tension member and an elongated connector body joined to the tension member which are positionable between the outer surface of the elongated core and the windable material to be wound about the region, and each tension member and corresponding connector body having a collective length and the elongated connector body has a free end at which is provided the material-anchoring location of the region, and the elongated connector body defines an opening which opens out of the free end thereof and through which the terminal end of a windable material can be inserted axially therein and within which the terminal end of the windable material is fixedly secured so as to prevent the withdrawal of the terminal end of the windable material from the connector body, and the length of each tension member and corresponding connector body is sized so that the single material-anchoring location of the second region is circumferentially-spaced about the outer surface of the core from the material-anchoring location of the first region as aforesaid and so that the single material-anchoring location of the third region is circumferentially-spaced about the outer surface of the core from the material-anchoring location of the second region as aforesaid.

8. In an item for holding windable materials wherein the item includes an elongated core having a longitudinal axis, first and second ends and defining an outer surface having a series of regions disposed axially along the core between the first and second ends and about which the windable materials can be wound simultaneously or from which the windable materials can be unwound simultaneously, wherein the windable material is wound about or unwound from the outer surface as the item is rotated about the longitudinal axis while the longitudinal axis remains substantially stationary and wherein there is associated with each region of the series of regions a single, and only a single, material-anchoring location at which the terminal end of a windable material is anchorable, and the item is adapted to be supported for rotation in one rotational direction about the longitudinal axis of the core during a material unwinding process involving the movement of material along a path which extends substantially tangentially of the outer surface of the core and substantially normal to the longitudinal axis of the core, the improvement comprising:

the series of regions are arranged along the core of the item in a sequential fashion so that as a path is traced axially along the outer surface of the elongated core from the first end thereof, a first region of the series of regions is disposed adjacent the first end of the core and each region of the series of regions subsequent to the first region is disposed adjacent the region which immediately precedes the subsequent region, and the single material-anchoring location of each subsequent region in the series of regions subsequent to the first region is circumferentially spaced about the outer surface of the core from the single material-anchoring location of the region which immediately precedes the subsequent region by a predetermined distance and in a circumferential direction about the outer surface of the core which is opposite the one rotational direction in which the item is rotated during a material unwinding process; and wherein the predetermined distance is not equal to zero and is less than the circumference of the core so that the material-anchoring locations are not all arranged along a linear path which extends axially along the outer surface of the core.

9. The improvement as defined in claim 8 wherein the predetermined distance is within the range of between about three inches and twelve inches.

10. The improvement as defined in claim 8 wherein each region of the series of regions includes two side boundaries and the material-anchoring location of each region of the series of regions is disposed substantially midway between the two side boundaries of the region.

11. The improvement as defined in claim 8 wherein each material-anchoring location is provided by an elongated connector body portion which defines an opening in one end thereof through which the terminal end of a windable material can be inserted and within which the terminal end of the windable material is fixedly secured so as to prevent the withdrawal of the windable material from the connector body and for purposes of anchoring the terminal end of the windable material to the core at the material-anchoring location.

12. The improvement as defined in claim 8 wherein each material-anchoring location is provided with an abutment surface against which the terminal end of a windable material is positionable when the windable material is anchored to the outer surface of the core.

13. In an item having an elongated core including three regions which are disposed axially along the core and about which three windable materials can be wound simultaneously or from which three windable materials can be unwound simultaneously, wherein the windable materials are wound about or unwound from the outer surface as the item is rotated about the longitudinal axis while the longitudinal axis remains substantially stationary and wherein the core defines an outer surface and one of the three regions includes a first one and only one location at which the terminal end of a first of the three windable materials is anchorable and wherein the second of the three regions includes a second one and only one location at which the terminal end of a second of the three windable materials is anchorable and wherein the third of the three regions includes a third one and only one location at which the terminal end of a third of the three windable materials is anchorable, and the item is adapted to be supported for rotation in one rotational direction about the longitudinal axis of the core during a material unwinding process involving the movement of each material along a path which extends substantially tangentially of the outer surface of the core and substantially normal to the longitudinal axis of the core, the improvement characterized in that:

the second one location is disposed at a position associated with the outer surface which is circumferentially spaced by a predetermined distance from a first imaginary line traced axially along the outer surface of the core from the first one location and in a direction from the first imaginary line which is opposite the one rotational direction of the core during a material unwinding process; and the third one location is disposed at a position associated with the outer surface which is circumferentially spaced by the predetermined distance from a second imaginary line traced axially along the outer surface of the core from the second one location and in a direction from the second imaginary line which is opposite the one rotational direction of the core during a material unwinding process; and wherein the predetermined distance is not equal to zero and is less than the circumference of the core so that the material-anchoring locations are not all arranged along a linear path which extends axially along the outer surface of the core.

14. The improvement as defined in claim 13 wherein the predetermined distance is within the range of between about three inches and twelve inches.

15. The improvement as defined in claim 14 wherein the predetermined distance is within the range of between about four inches and seven inches.

16. The improvement as defined in claim 13 wherein each region of the three regions includes two side boundaries and the material-anchoring location of each region of the three regions is disposed substantially midway between the two side boundaries of the region.

17. The improvement as defined in claim 13 wherein there is associated with each region of the three regions a tension member and an elongated connector body joined to the tension member which are positionable between the outer surface of the elongated core and the windable material to be wound about the region, and each tension member and corresponding connector body having a collective length and the elongated connector body has a free end at which is provided the material-anchoring location of the region, and the elongated connector body defines an opening which opens out of the free end thereof and through which the terminal end of a windable material can be inserted and within which the terminal end of the windable material is fixedly secured so as to prevent the withdrawal of the terminal end of the windable material from the connector body, and the collective length of each tension member and corresponding body is sized so that the one material-anchoring location of the second region is circumferentially-spaced about the outer surface of the core from the one material-anchoring location of the first region as aforesaid and so that the one material-anchoring location of the third region is circumferentially-spaced about the outer surface of the core from the one material-anchoring location of the second region as aforesaid.

18. In an item having an elongated core having a longitudinal axis and an outer surface about which three windable materials can be wound or from which three windable materials can be unwound, wherein the windable materials are wound about or unwound from the outer surface of the elongated core simultaneously as the item is rotated about the longitudinal axis of the elongated core while the longitudinal axis remains substantially stationary and wherein the outer surface of the elongated core is substantially cylindrically-shaped and includes three regions disposed axially therealong wherein there is associated with a first of the three axially-disposed regions a first one and only one location at which the terminal end of a first windable material is anchorable for material winding purposes, wherein there is associated with a second of the third axially-disposed regions a second one and only one location at which the terminal end of a second windable material is anchorable for material winding purposes, and wherein there is associated with a third of the three axially-disposed regions a third one and only one location at which the terminal end of a third windable material is anchorable for material winding purposes, and wherein the item is intended to be supported for rotation in one rotational direction about the longitudinal axis of the core during a material unwinding process involving the movement of each material of the three windable materials along a path which extends substantially tangentially of the outer surface of the core and substantially normal to the longitudinal axis of the core, the improvement comprising:

the second one location is disposed at a position associated with the outer surface which is circumferentially spaced by a predetermined distance from a first imaginary line traced axially along the outer surface of the core through the first one location and in a direction from the first imaginary line which is opposite the one rotational direction of intended rotation of the core during a material unwinding process; and the third one location is disposed at a position associated with the outer surface which is circumferentially spaced by the predetermined distance from a second imaginary line traced axially along the outer surface of the core through the second one location and in a direction from the second imaginary line which is opposite the one rotational direction of intended rotation of the core during a material unwinding process wherein the predetermined distance is not equal to zero and is less than the circumference of the core so that the material-anchoring locations are not all disposed in a line which extends axially along the outer surface of the core.

19. In an item for holding windable materials having an elongated core defining an outer surface having multiple zones which are disposed axially along the length of the core and about which the multiple windable materials can be wound simultaneously or from which the multiple windable materials can be unwound simultaneously, wherein the windable material is wound about or unwound from the outer surface of the core as the item is rotated about the longitudinal axis while the longitudinal axis remains substantially stationary and wherein there is associated with each of the multiple zones a single, and only a single, location at which a terminal end of a windable material is anchorable for purposes of winding the multiple windable materials about the core, and wherein the item is intended to be supported for rotation in one rotational direction about the longitudinal axis of the elongated core during a material unwinding process involving the movement of material along a path which extends substantially tangentially of the outer surface of the core and substantially normal to the longitudinal axis of the core, the improvement comprising:

the material-anchoring location associated with a first zone of the multiple zones is a first anchoring location; and the single material-anchoring location associated with the second zone of the multiple zones is a second anchoring location and the second anchoring location is circumferentially spaced from a first imaginary line traced axially along the outer surface of the elongated core from the first anchoring location by a predetermined distance and in a direction from the first imaginary line which is opposite the one rotational direction of the elongated core during a material unwinding process; and the single material-anchoring location associated with the third zone of the multiple zones is a third anchoring location and the third anchoring location is circumferentially spaced from a second imaginary line traced axially along the outer surface of the elongated core from the second anchoring location by the predetermined distance and in a direction from the second imaginary line which is opposite the one rotational direction of the elongated core during a material unwinding process; and wherein the predetermined distance is not equal to zero and is less than the circumference of the core so that the material-anchoring locations are not all arranged along a linear path which extends axially along the outer surface of the core.

20. In a core-including item for holding three windable materials wherein the item includes an elongated core having a longitudinal axis and an outer surface about which the windable materials are Lo be wound, wherein the windable materials are of substantially equal length and are wound simultaneously about or unwound simultaneously from the outer surface as the item is rotated about the longitudinal axis of the elongated core while the longitudinal axis remains substantially stationary and each windable material includes a terminal end which is securable to the core-including item for anchoring the windable materials thereto and an opposite free end, the improvement characterized in that:

the core-including item includes a first one and only one anchoring location at which a first of the three windable materials is anchorable; a second one and only one anchoring location at which a second of the three windable materials is anchorable and a third one and only one anchoring location at which a third of the three anchoring locations is anchorable, and the first, second and third locations are disposed in such a positional relationship with respect to one another so that after securing the first, second and third of the windable materials, respectively, to the first, second and third anchoring locations and winding the first, second and third one windable materials about the core of the core-including item by rotating the elongated core about its longitudinal axis, the free ends of the first and second windable materials are circumferentially spaced from one another about the core by a predetermined distance and so that the free ends of the second and third windable materials are circumferentially spaced from one another by the predetermined distance wherein the predetermined distance is not equal to zero and is less than the circumference of the core so that the material-anchoring locations are not all arranged along a linear path which extends axially along the outer surface of the core.

21. A method for anchoring three windable materials of substantially equal length about a core-including item including an elongated core having a longitudinal axis and an outer surface about which the windable materials are to be wound, wherein the windable materials are simultaneously wound about or simultaneously unwound from the outer surface as the item is rotated about the longitudinal axis while the longitudinal axis remains substantially stationary and wherein each windable material includes a terminal end which is securable to the core-including item for anchoring the windable materials thereto and an opposite free end, the method comprising the steps of:

securing a first of the plurality of windable materials to the item at a first one and only one anchoring location associated with the item and securing a second of the plurality of windable materials to the item at a second one and only one anchoring location associated with the item, and the first and second one anchoring locations are disposed in such a positional relationship with respect to one another so that after securing the first and second of the windable materials to the first and second anchoring locations and winding the first and second one windable materials about the core of the core-including item by rotating the elongated core about its longitudinal axis, the free ends of the first and second windable materials are circumferentially spaced from one another about the core by a predetermined distance and securing a third of the three windable materials to the item at a third one and only one anchoring location associated with the item, and the second and third one anchoring locations are disposed in such a positional relationship with respect to one another so that after securing the second and third of the windable materials to the second and third anchoring locations and winding the second and third one windable materials about the core of the core-including item by rotating the elongated core about its longitudinal axis, the free ends of the second and third windable materials are circumferentially spaced from one another about the core by the predetermined distance wherein the predetermined distance is not equal to zero and is less than the circumference of the core so that the material-anchoring locations are not all arranged along a linear path which extends axially along the outer surface of the core.

* * * * *